Sept. 16, 1958 H. B. ABER ET AL 2,851,841
TRACTOR MOUNTED HARVESTER
Filed Aug. 8, 1956 2 Sheets-Sheet 1
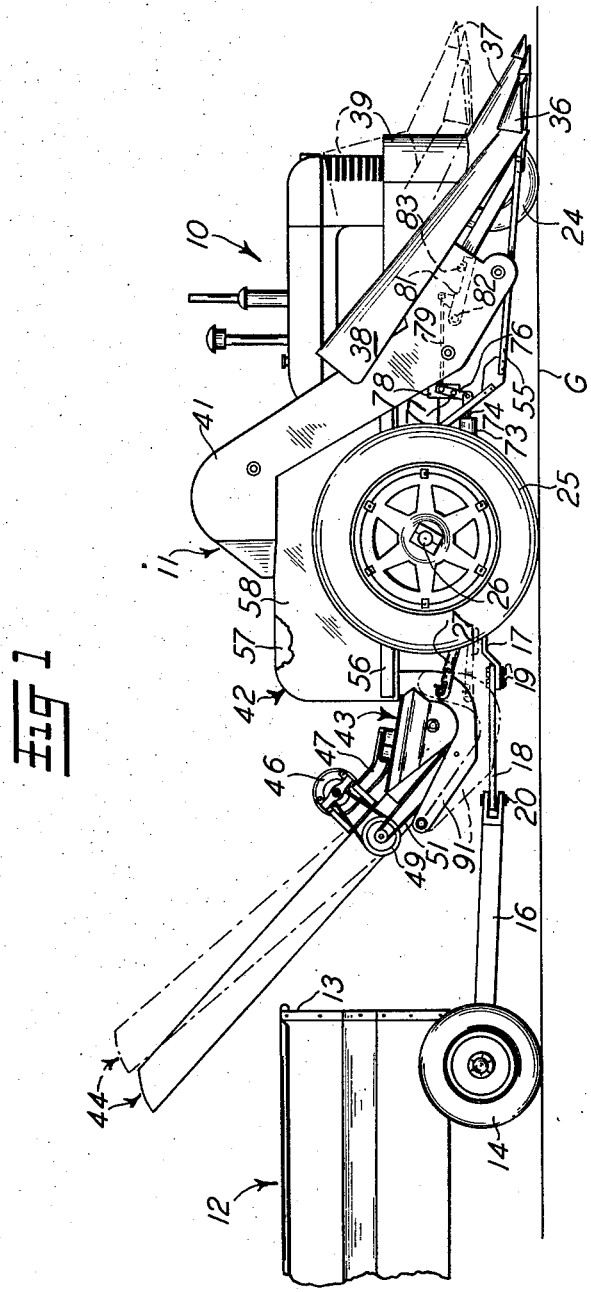
INVENTORS:
HOMER B. ABER
ROBERT B. KENNICUTT
BY: Emerson B Donnell
ATTORNEY

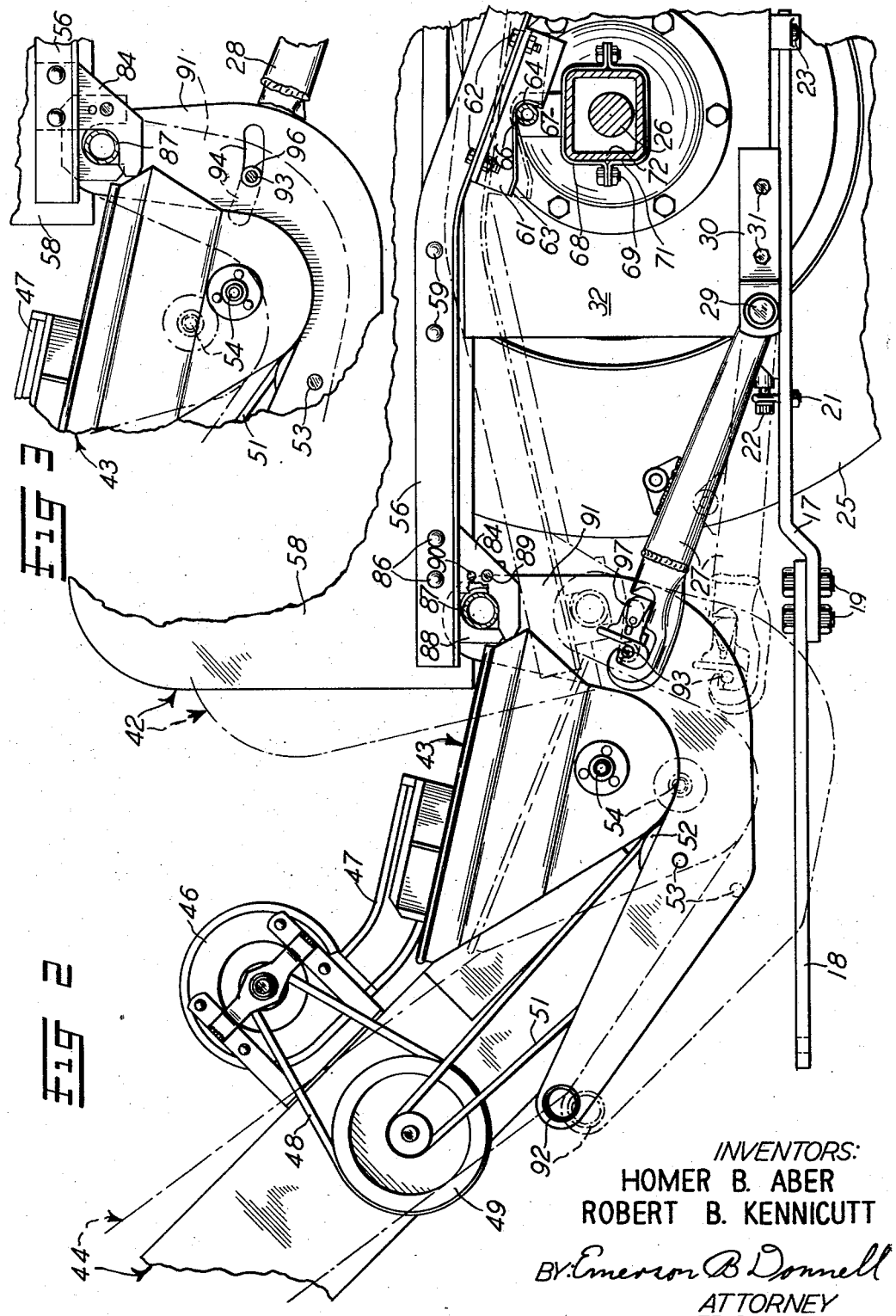

United States Patent Office 2,851,841
Patented Sept. 16, 1958

2,851,841

TRACTOR MOUNTED HARVESTER

Homer B. Aber, Racine, Wis., and Robert B. Kennicutt, Moline, Ill., assignors to J. I. Case Company, Racine, Wis., a corporation of Wisconsin Application August 8, 1956, Serial No. 602,702

8 Claims. (Cl. 56—15)

This invention relates to tractor mounted implements, and, more specifically, it relates to tractor mounted harvesters which are articulately mounted on the tractor.

It is an object of this invention to provide a tractor mounted harvester wherein the front and rear portions of the harvester are simultaneously movable in the same direction up and down while operatively attached to the tractor for harvesting.

Another object of this invention is to provide a tractor mounted harvester wherein the rear portion of the harvester is vertically pivotal independent of the front portion and the tractor. In accomplishing this object, the harvester is relieved of strains otherwise imposed thereon where the harvester encounters uneven ground or the like and the harvester elevator is tipped into contact with the trailing crop-receiving vehicle.

It is also an object of this invention to provide a tractor mounted harvester, with an elevator extending rearwardly to a crop-receiving vehicle, wherein the elevator is raised when the front of the harvester is raised and thus the elevator and the vehicle do not bump each other.

Other objects and advantages will become apparent upon reading the following description in conjunction with the accompanying drawings, wherein:

Fig. 1 is a side elevational view of a tractor and a fragment of a wagon, and a harvester including a preferred embodiment of this invention and having parts broken away and parts shown in other positions by dotted lines.

Fig. 2 is an enlarged side elevational view of a fragment of Fig. 1 with parts broken away and parts in section.

Fig. 3 is an enlarged side elevational view of a fragment of Fig. 2 with parts in section.

The same reference numerals refer to the same parts throughout the several views.

The drawings show a conventional tractor 10 with a harvester 11 mounted thereon. The front half of a trailing vehicle or wagon 12 is shown and the wagon includes the front wall 13 and the usual ground wheel 14. Also, a tongue 16, attached to the wagon as a part thereof is secured to the tractor drawbar 17 by a rigidly attached drawbar extension 18, which is attached to the drawbar by two bolts 19, a vertically disposed pivot pin 20 horizontally pivotally connecting the front end of the tongue with the rear end of the extension 18. It should thus be understood that the wagon and the tractor are pivotally joined at the pin 20. The drawbar itself is atached to the tractor in the usual manner through a U-bolt 21 which is suspended from a bolt 22 anchored to the tractor chassis, and a bolt 23 secures the forward end of the drawbar to the tractor, all in the usual manner.

Of course the tractor has the usual front wheels 24 and rear wheels 25, with the two vehicles being mobile on the ground indicated by the ground line "G," Further, the usual tractor rear axle 26 and hitch arms or links 27 and 28 are included on the tractor. It should be understood that while only one hitch arm 27 is fully shown in Fig. 2, the other hitch arm 28 is identically arranged so that both are in their usual positions slightly inwardly of the lateral positions of the tractor rear wheels. Fig. 2 shows the arm 27 pivotally attached to the tractor on a horizontal second pivot pin 29 which is secured in a bracket 30 secured by bolts 31 to the tractor chassis member 32. Of course the other tractor lift arm 28 is mounted in the same manner as arm 27 of Fig. 2 wherein the arm is on the near side of the tractor and the near rear wheel 25 has been removed.

The harvester 11 is of the corn picking type and it includes the usual forwardly located side points 36 and a center point 37. The usual stalk-way sheets 38 enclose the corn gathering chains and picking rolls (both not shown) and the sheet 39 encloses a part of the tractor. A side elevator 41 receives the ears of corn from the picking rolls and conveys the corn to the husking section 42, and from there the corn drops into a hopper 43 so that a rear elevator 44 can receive the corn from the hopper and transfer it into the wagon 12. A fan 46 is mounted on the elevator 44 and exhausts through the outlet duct 47 to blow on the corn in the hopper and thereby remove the chaff. The fan 46 is driven by the belt 48 on a pulley 49 rotatably mounted on the elevator 44. Another belt 51 is drivingly associated with the shaft on which the pulley 49 is located, and is trained on the pulley 52 which is mounted on the shaft 53, which is also the drive shaft for the elevator 44, and it is, therefore, mounted on the elevator. A shaft 54 is mounted on the hopper 43 and extends thereacross to provide a mounting and the power for an auger conveyor (not shown) inside the hopper. The precise structure of these parts is not important in this invention, but mention of them is made to identify the parts and disclose their functions. Beyond that, the parts are conventional and are well known to anyone skilled in the art of harvester manufacturing. Of course, it should also be understood that the elevator is disposed along the fore-and-aft axis of the tractor, and the parts are driven through the usual connection to the power take-off shaft of the tractor.

Referring again to the harvester front portion comprised of the points 36 and 37, the stalk-ways 38, the elevator 41, and the husking section 42, it should be understood that this front portion is all attached together in one unit and a frame piece or angles 55 and 56 provide the means for mounting the unit on the tractor. The angles 55 and 56 are fastened together and the front end of the angle 55 is attached to the point 36. The husking section 42 includes two vertically disposed side sheets 57 and 58 which are each attached through bolts 59 to one of the angles 56 along each side of the harvester. Fig. 2 shows a bracket 61 secured to the underside of the angle 56 by bolts 62. The bracket has an inclined rear bottom edge 63 and a notch 64 located forward of the inclined edge 63. A rod or fulcrum or horizontal support 66 is shown disposed in the notch 64, and the rod is supported on a bracket 67 which is suitably secured to a member 68. The later is attached to the tractor over the rear wheel axle 26 by means of bolts 69 and a clamp 71 on a housing 72, as shown.

It should thus be understood that the harvester is all one unit, as mentioned, and the unit is supported on the tractor rod 66 in a first or front portion located forward of said fulcrum and a second or rear portion located rearward of said fulcrum, both with respect to the operating direction of movement of said harvester. Of course this connection is the same on the opposite unshown side of the harvester as the same parts are provided on the opposite side such that a second rod 66 is attached to the other end of the tractor axle. Thus, with this arrangement, the harvester can rock or pivot with respect to the tractor and about the axes of the rods 66. In this manner, the front portion of the harvester can pivot in a vertical plane such that the points 36 and 37 will move from the solid line position of Fig. 1 to the dotted line position shown. Similarly, Fig. 2 shows in dotted lines that the rear portion, which is to the rear of the rods 66, will be lowered when the points 36 and 37 are raised. Of course, it is common knowledge in the art that the points should be raised when turning the harvester, when transporting it to and from the work site, when adjusting for variations in the height of the ground, and when encountering a rise on the ground.

The bracket 61 is provided with the incline 63 and the notch 64 to facilitate attachment of the harvester to the tractor. Thus, the tractor can be driven into the harvester and the rods 66 will engage the edges 63 as the latter are disposed inclined to the rear. Further forward movement of the tractor will cause the rods to engage the notches 64 and thereby secure the tractor and the harvester against further movement of the tractor with respect to the harvester.

The mechanism for raising and lowering the front portion of the harvester can be any suitable mechanism, and the type shown in Fig. 1 consists of a power cylinder 73 which is suitably secured to the tractor and it has a piston rod 74 pivotally attached to one end of a link 76 which is pivoted at 77 to a plate 78 which is fixedly attached to the tractor. The upper end of the link 76 is pivotally attached to a drag link 79 which is pivotally attached to a lift arm 81 pivotally mounted on a shaft 82 which is fixedly secured to the tractor. The arm 81 slidably supports a horizontal pin 83 fixed to the front portion of the harvester. In this manner, projection of the piston rod 74 creates a pull on the link 79 and thus raises the pin 83 and the entire portion of the harvester forward of the fulcrum 66.

The harvester rear end consisting of the hopper 43 and the elevator 44 would be raised and lowered along with the raising and lowering of the husking section 42 except for the structure described hereinafter. The rear ends of the angle 56 support a depending bracket 84 through bolts 86. A mounting bar or first pivot 87 is received in the bracket 84, and a latch 88 is pivotally mounted on a pin 89 which is on the bracket 84, and a second pin 90 is then positioned through the latch and the bracket to secure the latch in the locked position shown. In this manner, the bar 87 is rockably secured to the rear portion of the harvester. The bar 87 has a vertically disposed U-shaped frame or support member 91 attached thereto, and the member 91 extends to a pipe 92 which is suitably secured to the underside of the elevator 44 and thus forms a vertically disposed or upwardly extending portion on said elevator. Also, the hopper 43 is disposed above the member 91 which, therefore, also supports the hopper. Thus, the hopper 43, the elevator 44, and the frame 91 form the rear end of the harvester and they are all connected together in one unit and suspended by the bar 87 from the husking section of the harvester. The bar 87 thus provides a pivot for the rear end of the harvester.

A rod or third pivot 93 is received in the ends of the tractor lift arms 27 and 28 to extend therebetween and be received in an arcuate slot 94 in the frame 91. The rod 93 preferably has a roller sleeve 96 thereon to snugly engage the slot, and the slot 94 is curved about the axis of the bar 87. The clamping structure 97, shown on the hitch arms 27 and 28 to secure the rod 93, is of a conventional design and forms no part of this invention. Of course, the clamping parts 97 of the hitch arms releasably secure the rod 93 to the arms 27 and 28. With the slot and rod arrangement described, the harvester rear end is free to pivot about the bar 87 to the limits of the slot 94 and this is, therefore, a lost motion connection. The weight of the rear end will normally cause the slot to be forward with respect to the rod and thus assume the position shown in Fig. 3 by the solid lines of the slot. The dotted lines of the slot show the slot position when the rear end of the harvester has been pivoted by the elevator bumping the wagon 12 or by a force acting upon the bottom of the rear portion. Fig. 3 also shows the dotted line position of the frame 91 and the shaft 54 when the rear end portion of the harvester is pivoted rearwardly.

An important motion achieved by the structure described is indicated by the dotted lines of Fig. 2. It will be noted that when the rear portion of the harvester, namely the angle 56 and the husking section 42, is lowered to its dotted line position when the points 36 and 37 are raised to their dotted line positions of Fig. 1, the elevator 44 is brought to the dotted line position of Figs. 1 and 2 and thus avoids bumping the front 13 of the wagon 12. That is, the elevator is not tipped down as would normally be expected, but instead the elevator is tipped to a more upright position to clear the wagon. This novel result is effected by the location of the various support points and pivots. Thus, the radius of pivot of the bar 87 is about the fulcrum 66 while the radius of pivot of the rod 93 is about the pin 29. While the bar 87 is lowered essentially straight down, by virtue of its pivot radius and its location slightly above the level of the pivot 66, the rod 93 is lowered and also moved rearwardly by virtue of its location with respect to its pivot 29. The frame 91 is thus not only lowered, it is also rotated slightly clockwise in Figs. 1 and 2. The hitch arms 27 and 28 are means which retard the pivot of the rear end about the fulcrum 66.

When a turn is made, the tractor drawbar is, of course, swung with the tractor and this causes the wagon to be pulled toward the new position of the pin 20 which is actually toward the tractor wheel on the outside of the turning radius. The wagon is thus pulled closer to the tractor and it has been found that the elevator will bump the wagon unless the elevator is pivoted upwardly as described when the gathering points are raised to make the turn.

While a specific embodiment of this invention has been shown and described, it should be understood that changes could be made therein without departing from the scope of the invention which is defined by the appended claims.

What is claimed is:

1. In a tractor having a rear axle, the combination with said tractor of a fulcrum adjacent said rear axle, a harvester supported on said fulcrum and having a first portion extending forwardly alongside the tractor and a second portion extending rearwardly of said fulcrum, a first pivot on said second portion spaced rearwardly of said fulcrum, a rearwardly extending upwardly directed crop-receiving and discharging elevator, a vertically disposed portion on said elevator engaged with said first pivot, a second pivot fixedly located on said tractor and spaced below said fulcrum, a link carried on said second pivot and inclined rearwardly and upwardly, a third pivot on said vertically disposed portion spaced downwardly from said first pivot a distance less than the spacing of said second pivot below said fulcrum, and said link being engaged with said third pivot whereby said elevator will be swung upwardly as the rearwardly extending portion of said harvester is swung downwardly by reason of upward swinging of said first portion of said harvester.

2. In a tractor mounted harvesting implement of the type for use with a tractor having a rear axle and including a forwardly directed harvester mounted along the sides of the tractor and having a front portion designed to be raised and lowered in accordance with crop harvesting conditions and a rearwardly directed crop receiving and discharge elevator carried by said harvester and tractor, the combination of a fulcrum support adjacent said rear axle, said harvester being pivotally supported on said fulcrum support and including a rear portion extending rearwardly therefrom, an upwardly extending portion on said elevator, a first pivot on said rear portion spaced backwardly from said fulcrum support on which said upwardly extending portion is supported, a second pivot on said tractor and located below and rearwardly of said fulcrum support, a link on said second pivot and extending rearwardly and upwardly, and connected to said vertically extending portion at a point below and rearwardly of said first pivot, the distance of said point below said first pivot being less than the distance of said second pivot below said fulcrum support, whereby the rearward extremity of said elevator will be swung upwardly as said rear portion of said harvester unit is swung downwardly by reason of upward swinging of said front portion of said harvester.

3. In a crop harvester and tractor combination wherein the tractor includes a rear axle and a pair of hitch arms attached to the tractor for vertical pivotal movement about an axis below the level of said axle and rearward thereof, the combination comprising a horizontal support mounted on said tractor adjacent said axle, a harvester front portion disposed on said horizontal support for rocking motion thereon and overbalanced toward the forward end of said tractor, a harvester rear portion integral with said front portion and extending rearwardly of said axle of said tractor, lift means on said tractor and engaged with said harvester front portion for vertically positioning the latter in selected over-balanced positions for raising and lowering the forward end of said harvester front portion, a harvester rear end including a crop elevator pivotally attached to said harvester rear portion for vertical pivotal movement with respect to said harvester rear portion, said hitch arms being attached to said harvester rear end for causing the latter to pivot about its pivot axis in a direction opposite to the direction of a pivot of said harvester front portion and in response to the pivoting of said harvester front portion.

4. In a tractor and crop harvester combination wherein the tractor includes a rear axle and a pair of hitch arms pivotally attached to said tractor, the combination of a fulcrum attached to said tractor adjacent said rear axle, a crop harvester rockably supported on said fulcrum and including a front portion disposed forward of said axle and a rear portion disposed rearward of said axle, a crop elevator pivotally attached to said rear portion of said harvester and in crop receiving communication with said harvester and extending rearwardly and away from said harvester, and a lost motion connection between said crop elevator and said hitch arms for limited pivotal and relative movement between said elevator and said harvester and with said connection allowing said relative movement in the direction of said elevator pivoting toward said harvester.

5. In a tractor and crop harvester combination wherein the tractor includes a rear axle and a pair of hitch arms pivotally attached to said tractor at a pivot location on a level below said axle, the combination comprising a crop harvester mounted on said tractor, a first pivot on said harvester, a crop elevator pivotally attached to said crop harvester at said first pivot and in crop receiving communication with said harvester, a lost motion connection between said crop elevator and said hitch arms below said first pivot and including a slot extending toward said pivot location for pivotal movement of said elevator away from said hitch arms.

6. In a tractor and crop harvester combination wherein the tractor includes a rear axle and a pair of hitch arms pivotally attached to said tractor at a location on a level below said axle, the combination comprising a crop harvester mounted on said tractor, a crop elevator pivotally attached to said crop harvester and in crop receiving communication with said harvester and said elevator having a slot disposed with the length thereof in the arc of pivot of said elevator on said harvester, a rod disposed in said slot, said hitch arms attached to said rod for limiting pivotal movement of said elevator with respect to said harvester to the limits of said length of said slot.

7. In a crop harvester and tractor combination wherein the tractor includes a rear axle and a pair of hitch arms attached to the tractor for vertical pivotal movement about an axis below the level of said axle and rearward thereof, the combination comprising a fulcrum on said tractor above said axle, a harvester pivotally supported on said fulcrum for pivotal movement up and down at the front portion and the rear portion of said harvester, an elevator pivotally suspended on said rear portion of said harvester for vertical pivotal movement and having a slot defined therein about the pivotal axis of said elevator, means disposed in said slot for sliding movement therein, and said hitch arms being attached to said means for limiting said elevator in its pivotal movement where the elevator tends to pivot toward said hitch arms.

8. In a crop harvester and tractor combination wherein the tractor includes a rear axle and a pair of hitch arms attached to the tractor for vertical pivotal movement about an axis below the level of said axle and rearward thereof, the combination comprising a fulcrum mounted on said tractor adjacent said axle, a harvester having a front portion disposed on said fulcrum for rocking motion thereon and over-balanced toward the forward end of said tractor and a rear portion extending rearwardly of said axle of said tractor, lift means on said tractor and engaged with said harvester front portion for vertically positioning the latter in selected over-balanced positions for raising and lowering the forward end of said harvester front portion, a crop elevator suspended on said rear portion of said harvester for vertical pivotal movement with respect to said rear portion, and into an over-balanced position rearwardly of said tractor, said hitch arms being connected to said elevator for restraining said elevator from pivoting in the direction of said over-balanced position.

References Cited in the file of this patent

UNITED STATES PATENTS

| | | |
|---|---|---|
| 2,555,559 | Prosser | June 5, 1951 |
| 2,700,262 | Andrews | Jan. 25, 1955 |